(12) United States Patent
Anderson

(10) Patent No.: US 11,832,543 B2
(45) Date of Patent: Dec. 5, 2023

(54) SPRAYER BOOM CONTROL FOR IMPROVED RIDE AND CONTROL

(71) Applicant: Deere & Company, Moline, IL (US)

(72) Inventor: Eric R. Anderson, Ames, IA (US)

(73) Assignee: Deere & Company, Moline, IL (US)

( * ) Notice: Subject to any disclaimer, the term of this patent is extended or adjusted under 35 U.S.C. 154(b) by 426 days.

(21) Appl. No.: 17/324,220

(22) Filed: May 19, 2021

(65) Prior Publication Data
US 2022/0369531 A1 Nov. 24, 2022

(51) Int. Cl.
*A01M 7/00* (2006.01)
*A01B 63/108* (2006.01)
*A01B 63/00* (2006.01)

(52) U.S. Cl.
CPC .......... *A01B 63/108* (2013.01); *A01B 63/008* (2013.01); *A01M 7/0057* (2013.01)

(58) Field of Classification Search
None
See application file for complete search history.

(56) References Cited

U.S. PATENT DOCUMENTS

| 7,165,395 | B2 | 1/2007 | Anderson et al. |
| 2006/0118653 | A1 | 6/2006 | Shivak |
| 2018/0220638 | A1* | 8/2018 | Gresch ................. A01M 7/0057 |
| 2020/0275645 | A1* | 9/2020 | Smith ................. A01M 7/0075 |
| 2021/0195886 | A1* | 7/2021 | Smith ................. A01M 7/0085 |
| 2021/0307313 | A1* | 10/2021 | Bauer ..................... F15B 1/021 |
| 2022/0386588 | A1* | 12/2022 | Dumont ............. A01M 7/0057 |

FOREIGN PATENT DOCUMENTS

| CA | 2525878 C | 5/2006 |
| CN | 105971953 B | 9/2016 |
| DE | 102016110693 A1 | 12/2017 |

OTHER PUBLICATIONS

German Search Report issued in application No. DE102022203066.4 dated Dec. 2, 2022 (08 pages).

* cited by examiner

*Primary Examiner* — James M McPherson
(74) *Attorney, Agent, or Firm* — Tucker Ellis LLP; Heather M. Barnes; Michael G. Craig

(57) ABSTRACT

A boom suspension system may comprise a center frame operably connected to a main frame with linkages configured for vertical movement. A sensor may be operably connected to a pair of boom structures, which may extend laterally outward from opposing sides of the center frame. A controller may be configured to receive input data from the sensor and determine forces or flow rate to tilt cylinders, which may be coupled between each boom structure and the center frame. Each tilt cylinder may be operably connected to a hydraulic circuit, which may comprise a flow control mode and a pressure control mode determined by the controller. The hydraulic circuit may comprise a first set of valves in parallel with a second set of valves. Each set of valves may comprise a solenoid valve in series with a pressure regulating valve and a pressure sensor disposed on either side of each solenoid valve.

20 Claims, 11 Drawing Sheets

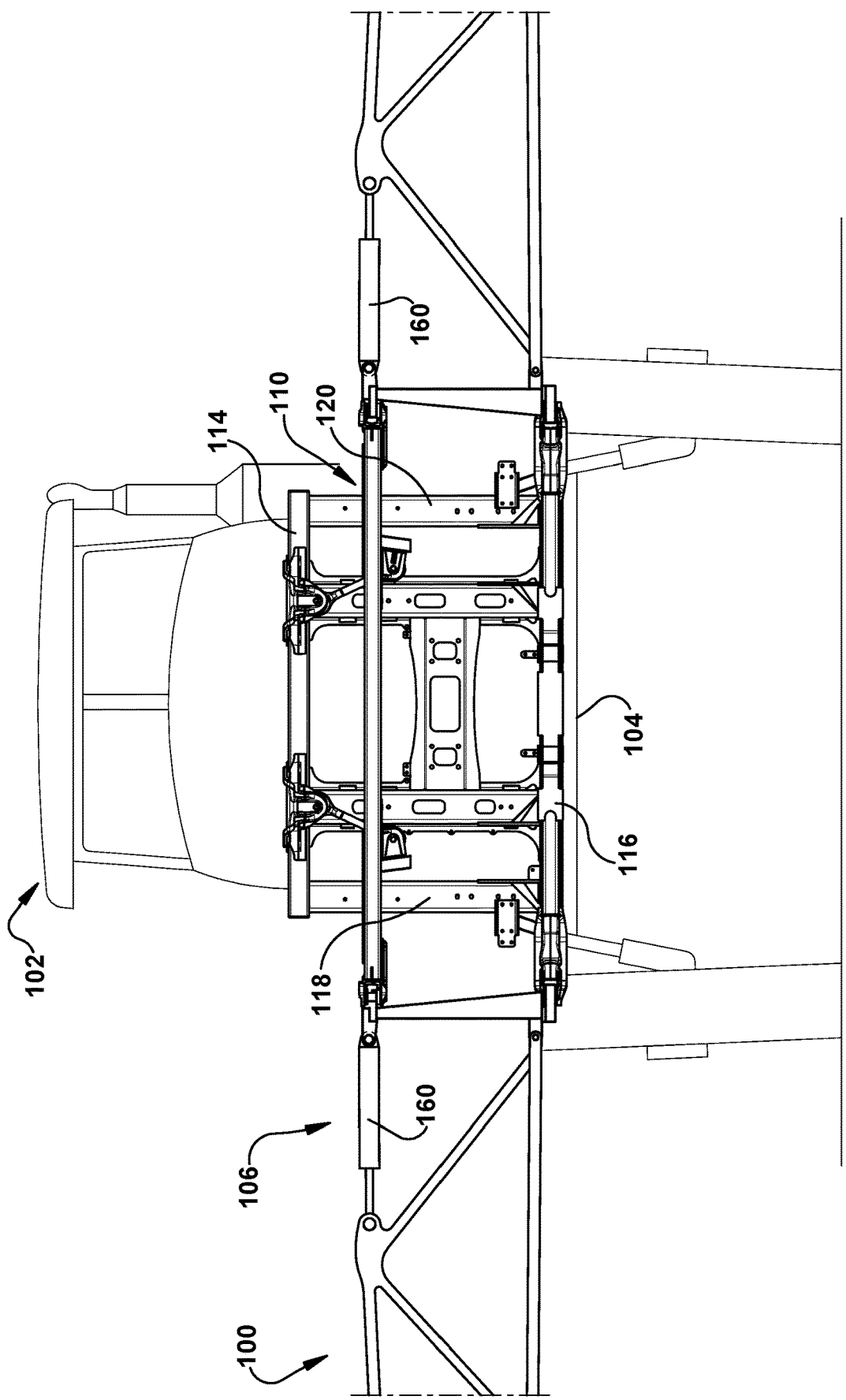

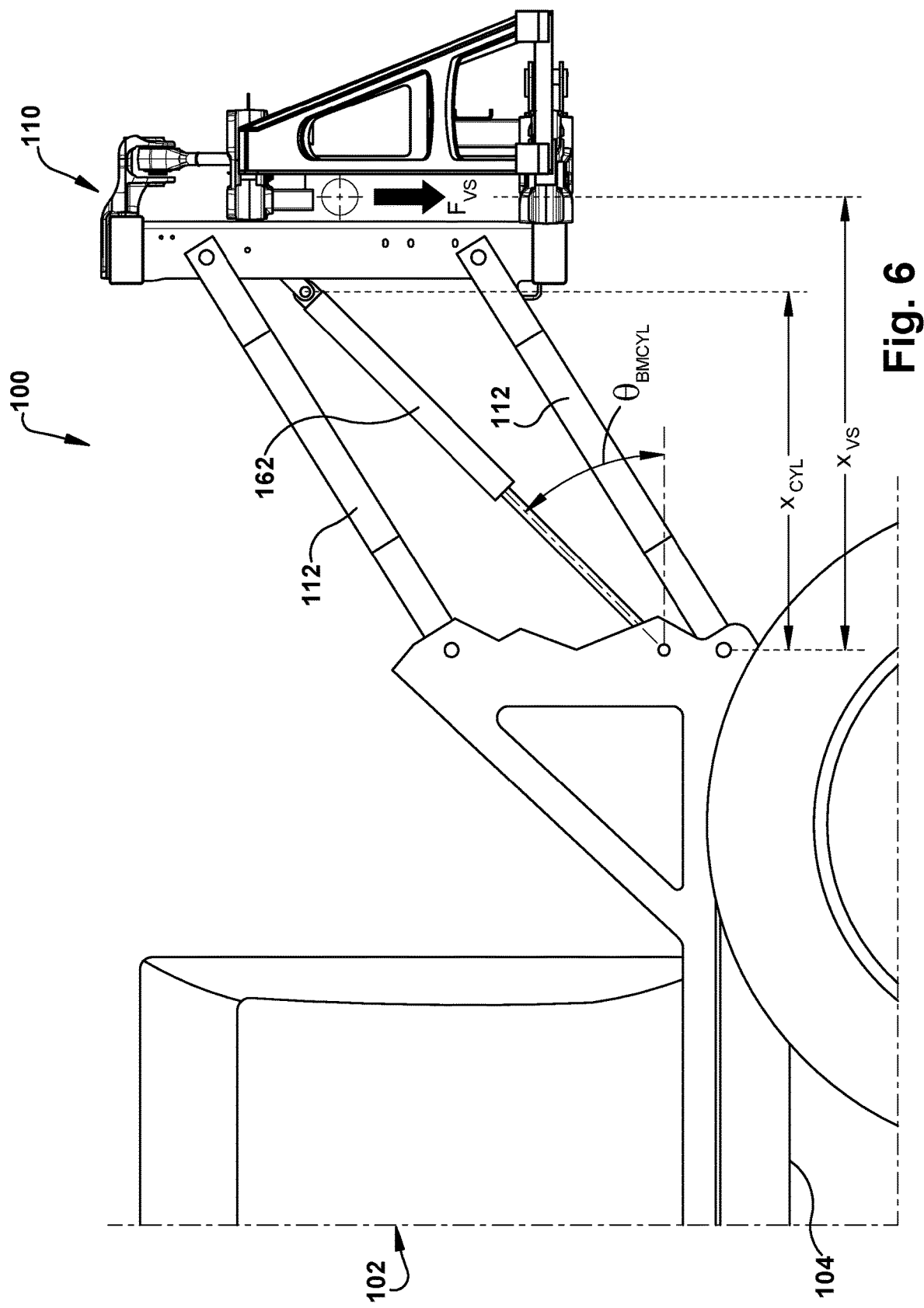

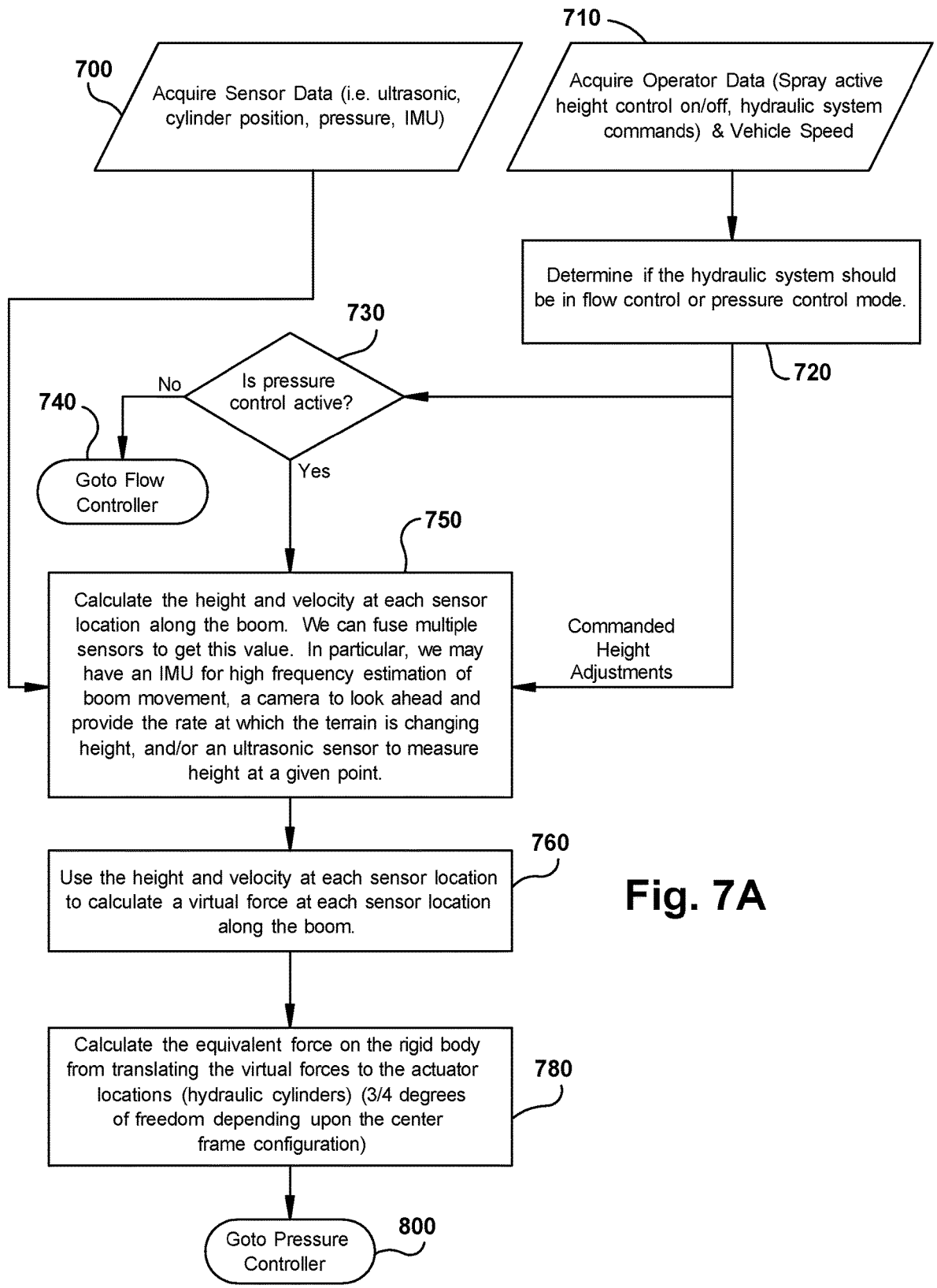

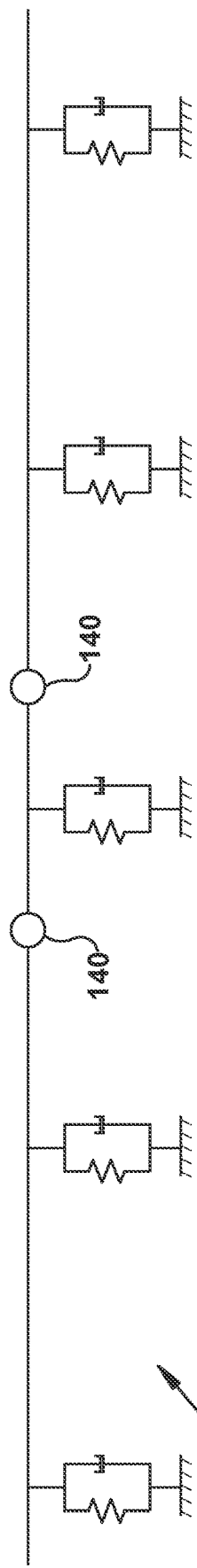
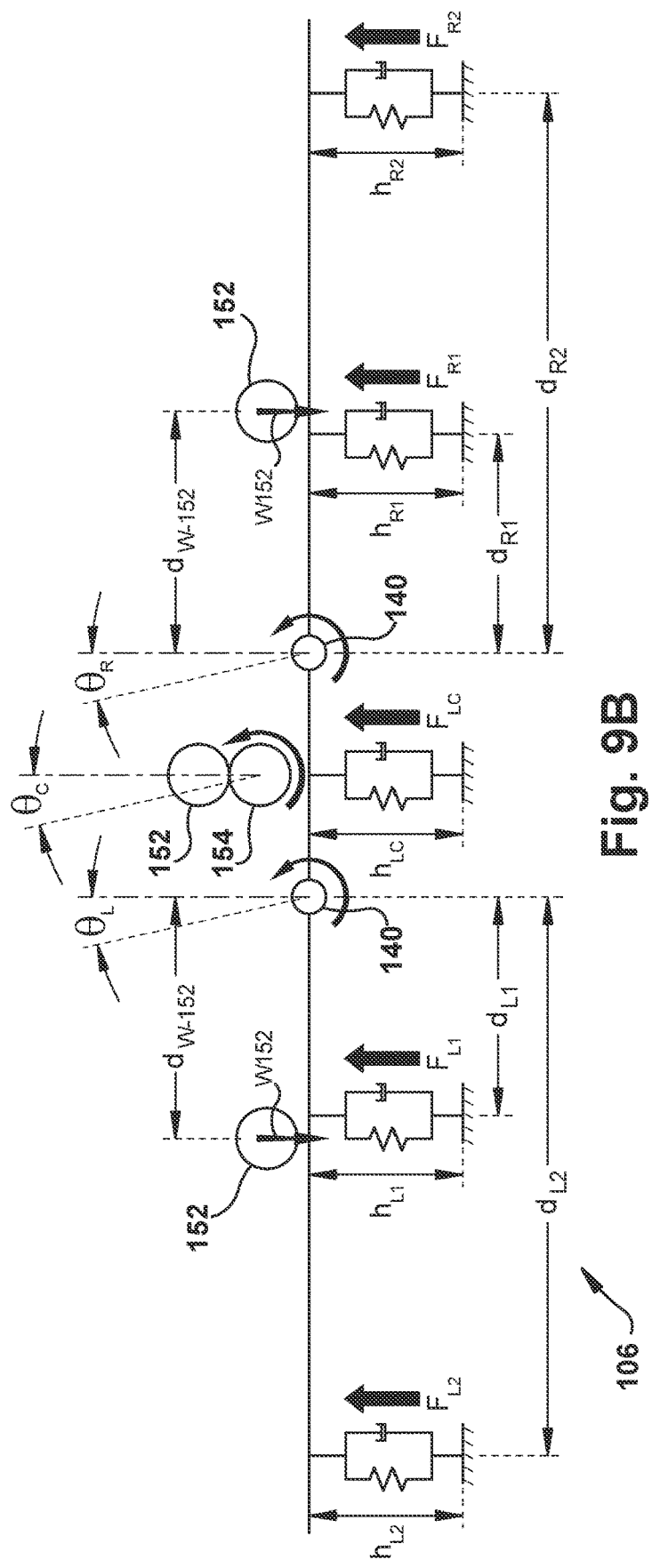

SPRAYER BOOM CONTROL FOR IMPROVED RIDE AND CONTROL

BACKGROUND

Boom sprayers are utilized to apply a chosen liquid, such as but not limited to, liquid fertilizers, pesticides, or other liquids to crops during their vegetative cycle. The boom sprayer's height is adjustable to ensure that crops receive the correct amount of the liquid being dispensed. Maintaining the boom at a consistent distance above an underlying service is desired. Proper performance of the boom sprayer is to effectively control the boom so it does not contact an underlying surface, such as the ground, and also maintains certain height above the underlying surface. The ability to control the boom performance and high speed precision plant spraying is also desired while maintaining a comfortable ride for the operator.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

In one implementation a boom suspension system may comprise a center frame operably connected to a main frame with linkages configured for vertical movement. The center frame may comprise a top member and a bottom member. A pair of boom structures may extend laterally outward from opposing sides of the center frame for pivotal movement upward and downward relative to the center frame. One or more sensors may be operably connected to each boom structure may be configured to sense the distance between discrete locations on the boom structure and the underlying surface. A controller may be configured to receive input data from the sensor and determine forces or flow rate to tilt cylinders. At least one tilt cylinder being coupled between each boom structure and the center frame. Each tilt cylinder may be operably connected to a hydraulic circuit. The hydraulic circuit may comprise a flow control mode and a pressure control mode determined by the controller. The hydraulic circuit may comprise a first set of valves and a second set of valves, the first set of valves in parallel with the second set of valves. Each set of valves may comprise a solenoid valve in series with a pressure regulating valve and a pressure sensor disposed on either side of each solenoid valve.

To the accomplishment of the foregoing and related ends, the following description and annexed drawings set forth certain illustrative aspects and implementations. These are indicative of but a few of the various ways in which one or more aspects may be employed. Other aspects, advantages and novel features of the disclosure will become apparent from the following detailed description when considered in conjunction with the annexed drawings.

BRIEF DESCRIPTION OF THE DRAWINGS

What is disclosed herein may take physical form in certain parts and arrangement of parts, and will be described in detail in this specification and illustrated in the accompanying drawings which form a part hereof and wherein:

FIG. 5 is a rear perspective view of a boom sprayer.

FIG. 6 is a side perspective view of an implementation of a boom sprayer.

FIG. 7A is a flow chart illustrating one implementation of a boom sprayer suspension system.

FIG. 9A is a flow chart illustrating one example of the control logic for the boom suspension system.

FIG. 9B is a flow chart illustrating one example of the control logic for the boom suspension system.

DETAILED DESCRIPTION

Figure 1:
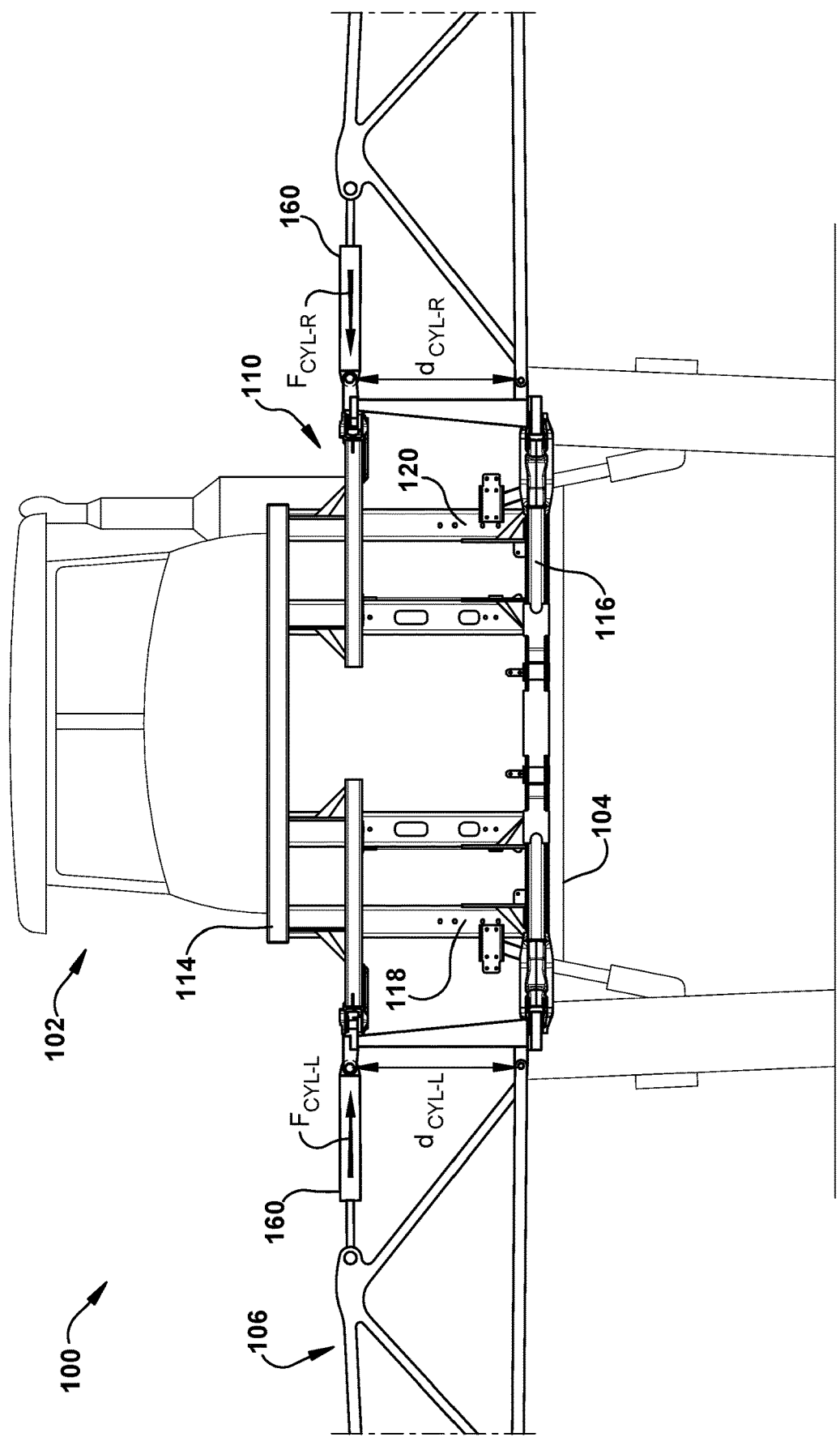
FIG. 1 is a rear perspective view of a boom sprayer.

The claimed subject matter is now described with reference to the drawings, wherein like reference numerals are generally used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are shown in block diagram form in order to facilitate describing the claimed subject matter.

In general, a boom suspension system 100 is disclosed for an agricultural vehicle, such as a boom sprayer 102. The boom suspension system 100 is intended to decouple high frequency inputs into a chassis 104 from a boom 106. In one implementation, this may be accomplished by using pressure control valves instead of flow control valves as part of the circuit controlling the tilt cylinders. It is believed that by regulating the pressure, when the chassis 104 undergoes a sudden movement rather than exerting a high force on the boom 106 due to the trapped oil in the flow control valve causing the boom 106 to move, the oil will exhaust or fill in the pressure control valve accordingly to maintain the same force on the boom 106 as described in greater detail below. Because the system may utilize pressure regulating valves (described below) during field operation and flow control valves for operations, such as deploying and folding boom arms, the overall configuration may prevent sudden changes in force, direction, or acceleration, which may be perceived as a jerking motion by the operator.

Turning to FIGS. 1-6, the boom sprayer 102 is illustrated. The boom sprayer 102 may comprise the boom suspension system 100, and various implementations. In this implementation the example boom suspension system 100 may comprise comprises a center frame 110 that may be operably (e.g., during operation of the system), fixedly engaged with the vehicle chassis 104. For example, the center frame 110 may be fastened (e.g., or otherwise operably, fixedly engaged) to lift arms 112 that are attached to the vehicle chassis 104, where the lift arms 112 are used to lift and lower the center frame 110 to a desired height. Further, in the example boom suspension system 100, the center frame 110 can comprise a top member 114 and a bottom member 116.

Figure 2:
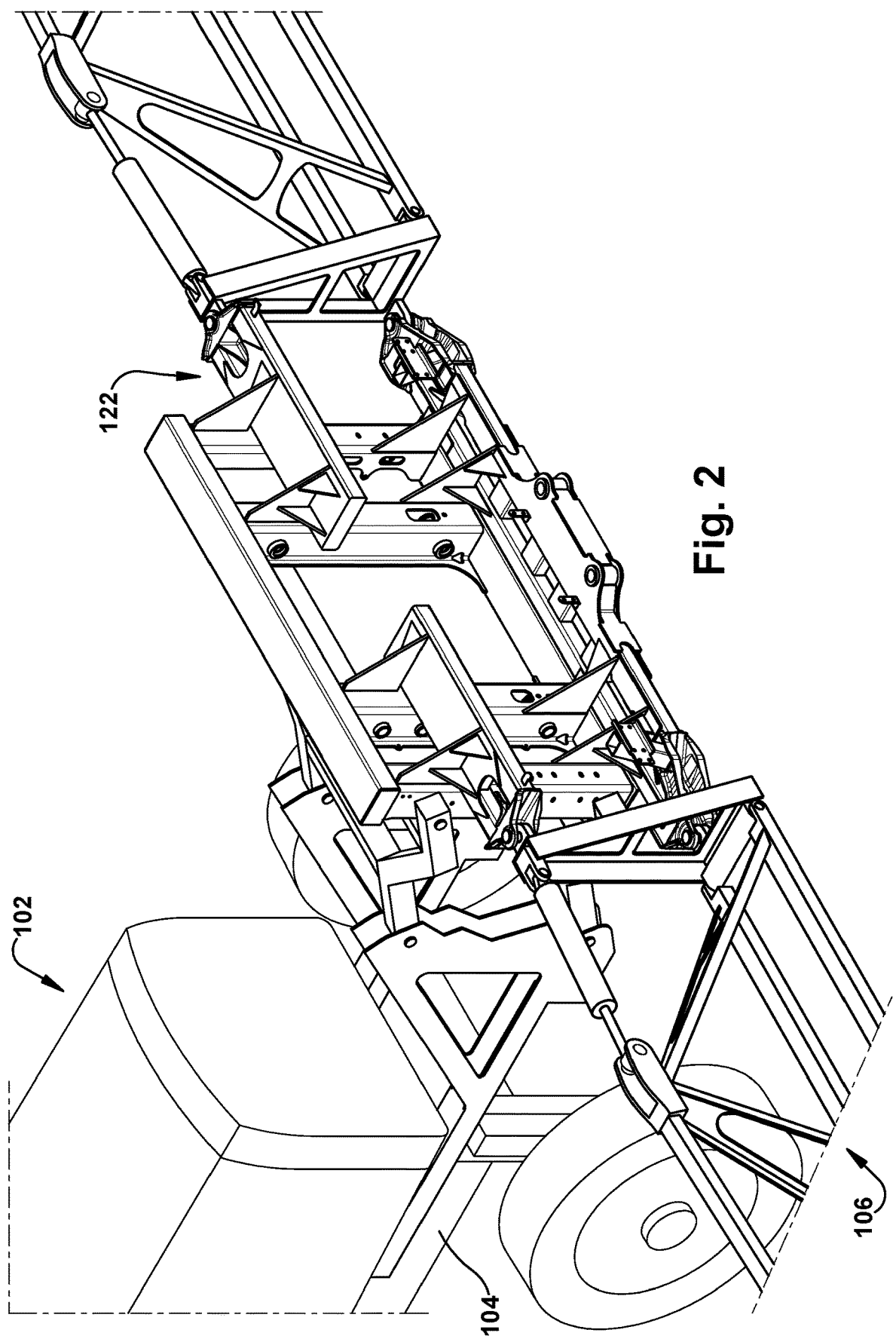
FIG. 2 is a perspective view of one implementation of a boom sprayer with a fixed center frame.
Figure 3:
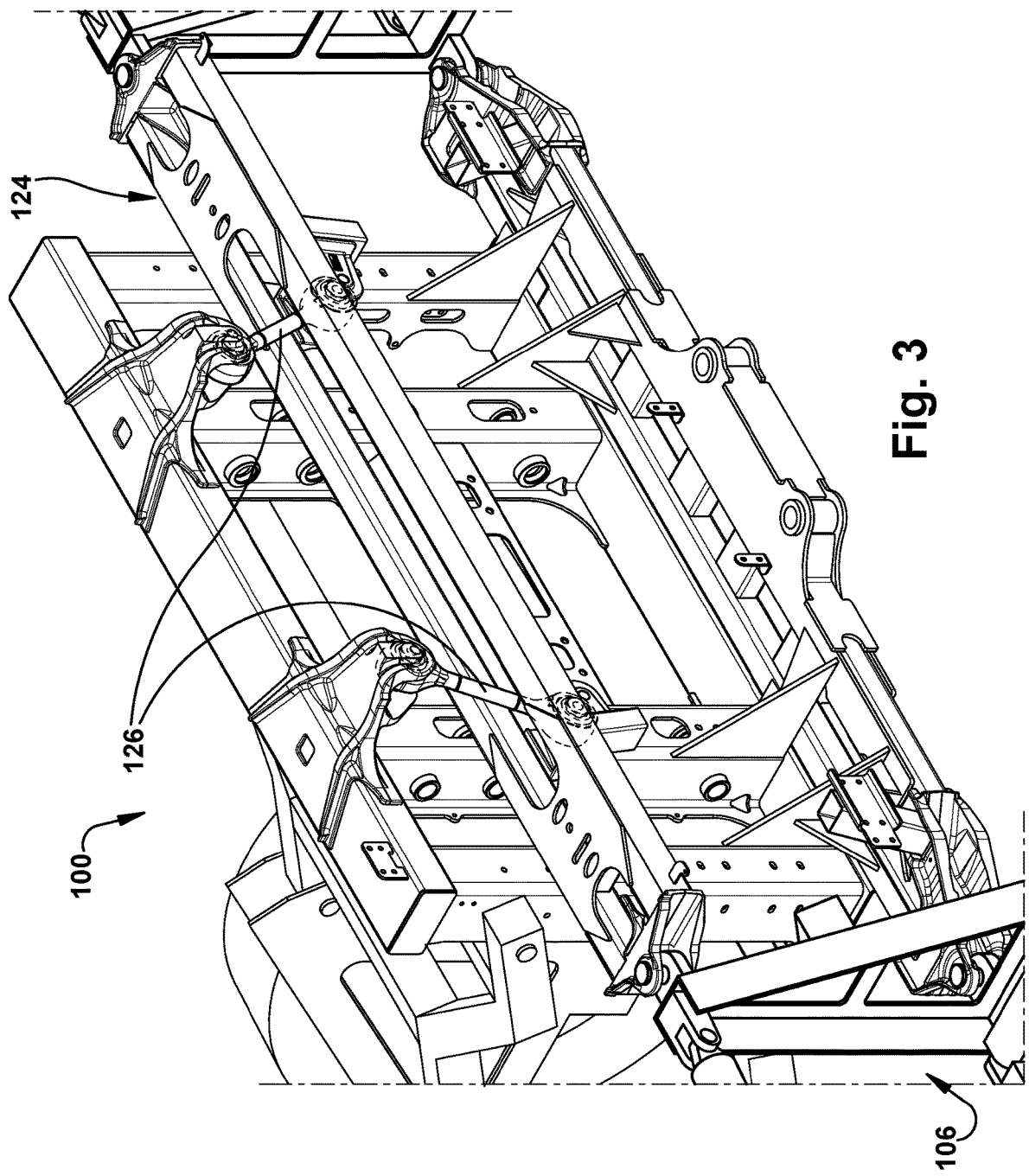
FIG. 3 is a perspective view of one implementation of a boom sprayer with a floating center frame.
Figure 4:
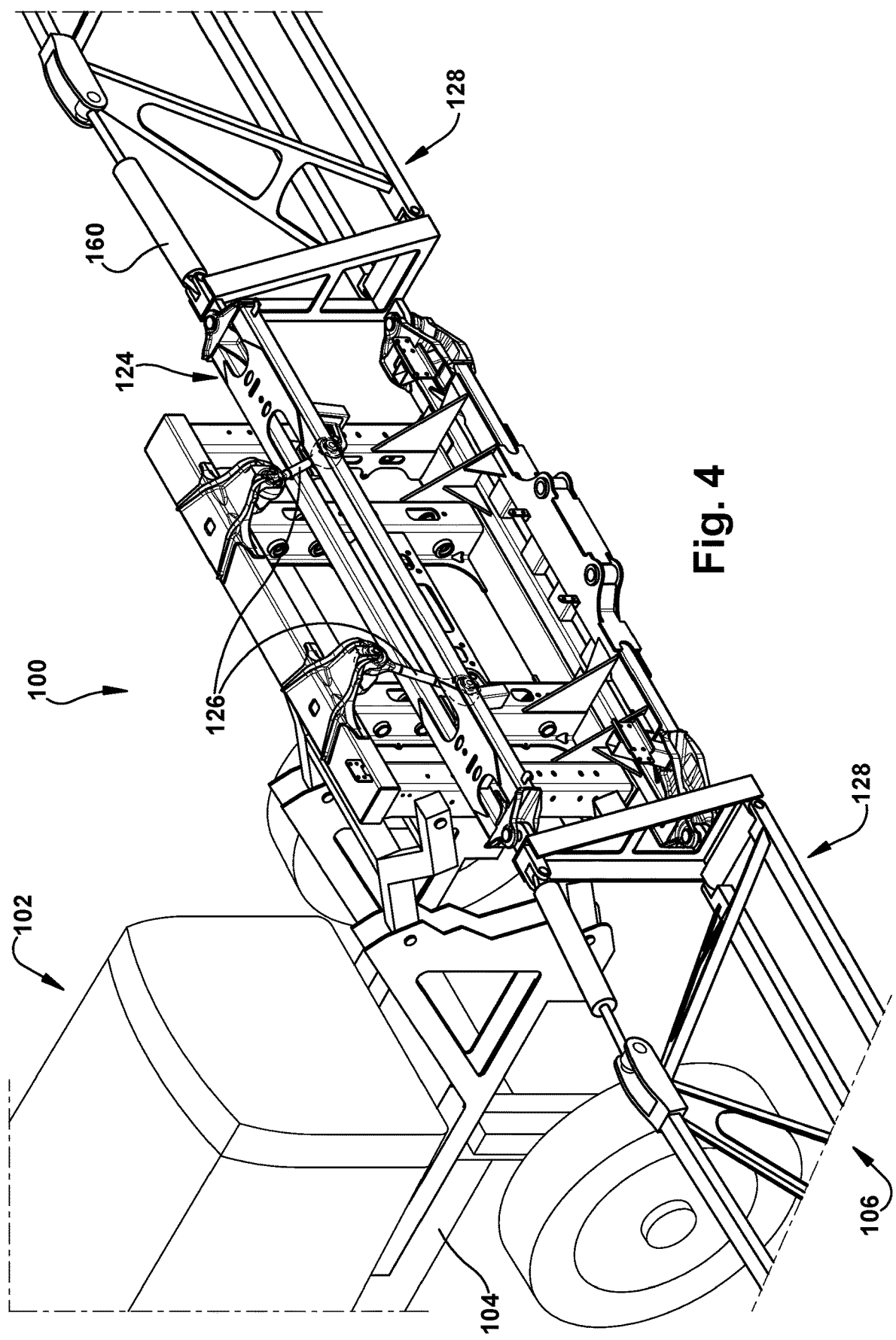
FIG. 4 is a perspective view of one implementation of a boom sprayer with a floating center frame.

In some implementations, the center frame 110 can also comprise a left or first vertical member 118 and a second or right vertical member 120. The first vertical member 118 and the second vertical member 120 can respectively be fixedly engaged with the top member 114 and the bottom member 116. In some implementations, the center frame 110 may comprise additional members, for example, depending on the amount of support needed, and/or the type of application. In some implementations, the top member 114 can comprise a first or left end 112 and a second or right end 114. By way of example, the center frame 110 may be a fixed central frame 122 as shown in FIG. 2. In other implementations, as illustrated in FIGS. 3 and 4, for example, the center frame 110 may be a floating central frame 124. The floating central frame 124 may be operably connected to the fixed central frame 122. The floating central frame 124 may be operably connected to the fixed central frame 122 through swing bars 126, for example, as shown in FIG. 4.

As previously stated, the boom suspension system 100 may comprise a center frame 110 operably connected to a main frame or chassis 104 with linkages configured for vertical movement. A pair of boom structures 128 may extend laterally outward from opposing sides of the center frame 110 for pivotal movement upward and downward relative to the center frame 110.

One or more sensors 140 may be operably connected to each boom structure 128 configured to sense the distance between each boom structure 128 and the underlying surface. Any sensor chosen with sound engineering judgment may be utilized. In one nonlimiting implementation, the sensor may be an ultrasonic sensor.

The boom suspension system 100 may further comprise a controller 150 which may be configured to receive input data from each sensor 140 and determine forces or flow rate to one or more tilt cylinders 160. At least one tilt cylinder 160 may be coupled between each boom structure 128 and the center frame 110. In one implementation, one tilt cylinder 160 may be operably connected to one boom structure 128, for example on a left boom structure, and another tilt cylinder may be operably connected on one of the boom structures 128, for example on a right boom structure. The tilt cylinder 160 may be configured to lift the boom structures 128 up and down relative to an underlying surface. In yet another implementation, a frame tilt cylinder 162 may be operably connected between the center frame 110 and the vehicle chassis 104. The frame tilt cylinder may be utilized to move the center frame 110 relative to the vehicle chassis. The tilt cylinder 160 may be actuated independently from or in conjunction with the frame tilt cylinder 162. The frame tilt cylinder 162 may be actuated independently from or in conjunction with the tilt cylinder 160.

Figure 8:
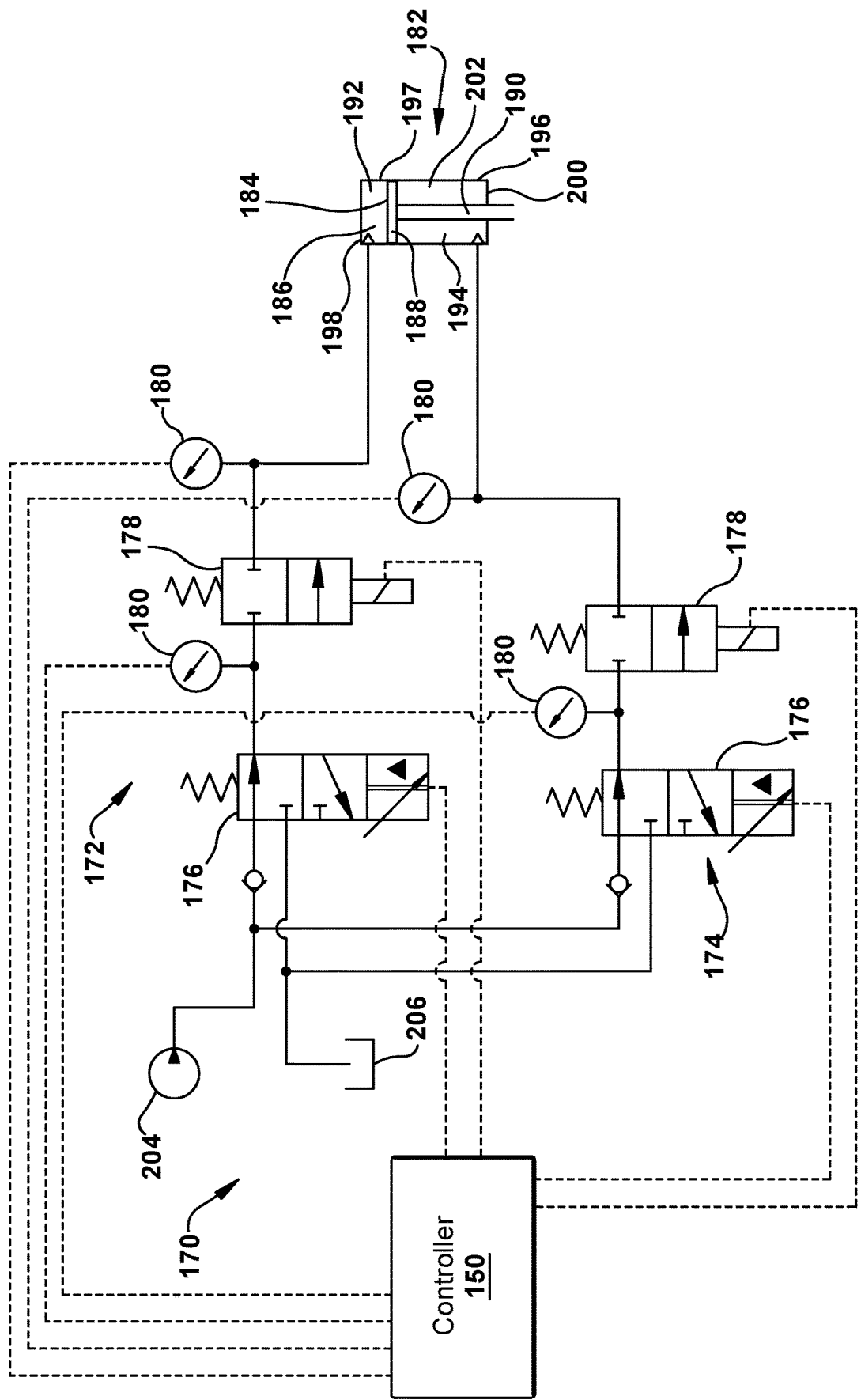
FIG. 8 is a schematic of a hydraulic circuit utilized in one implementation of the boom suspension system.

Each tilt cylinder 160, 162 may comprise a hydraulic circuit 170. With reference to FIG. 8, the hydraulic circuit 170 may comprise a flow control mode and a pressure control mode determined by the controller 150. The hydraulic circuit 170 may comprise a first set of valves 172 and a second set of valves 174. The first set of valves 172 may be in parallel with the second set of valves 174. Each set of valves 172, 174 may comprise a controlled lockout valve 176 in series with a pressure regulating valve 178. Each set of valves 172, 174 may comprise a pressure sensor 180 disposed on either side of each pressure regulating valve 178. Each pressure sensor 180 may be communicatively couple to the controller 150. The controller 150 may receive data from one or more pressure sensors 180 indicative of pressure encountered in the hydraulic circuit 170. The pressure regulating valve 178 may be communicatively coupled to the controller 150. In one example, after the controller 150 may receive data input from one or more sensors 140, such as the pressure sensors 180, and then the controller 150 may send data to the pressure regulating valve 178 indicative of an appropriate pressure to apply to the hydraulic circuit 170, such that the boom 106 maintains the proper distance above the underlying surface. In one non-limiting example, the pressure regulating valve 178 may be an electrohydraulic pressure regulating valve or a solenoid valve. In another implementation, the pressure regulating valve 178 may be an enable valve.

The hydraulic circuit 170 may further comprise a hydraulic cylinder 182. The hydraulic cylinder 182 may comprise a piston (or head end) 184 with a first piston surface 186 and a second piston surface 188, a rod (or rod end) 190, a piston side 192, a rod side 194, a cylindrical wall 196, a first end wall 198 and a second end wall 200. The piston side 192 may comprise the first surface 186, the first end wall 198 and a first cylindrical portion 197 of the cylindrical wall 196 between the first piston surface 188 and the first end wall 198. The rod side 194 may comprise the second piston surface 188, the second end wall 200 and a second cylindrical portion 202 of the cylindrical wall 196 between the second piston surface 188 and the second end wall 200. The volumes of the piston side 192 and the rod side 194, as well as the lengths of the first and second cylindrical portions 197, 202 change as the hydraulic cylinder 182 extends and retracts. With reference to FIG. 8, the head end 184 may be coupled with the first set of valves 172. The rod end 190 may be coupled with the second set of valves 174. The hydraulic cylinder 182 may be operably connected to a fluid pressure source 204 and a fluid reservoir 206.

In one implementation, precise monitoring of pressure enables closed loop control of the force being applied to the tilt cylinders 160, 162. By using pressure regulating valves 178, the mechanical bandwidth of the regulating valves 178 is achieved, which is very high and the force control can be at a lower frequency.

With continuing reference to the controller 150, the controller 150 may be configured to receive a plurality of inputs from the sensors 140. The controller 150 may provide a plurality of outputs to each tilt cylinder 160, 162 so as to maintain a pressure pattern that maintains a substantially constant height between the boom structure 128 and the underlying surface In implementation, the controller 150 may automatically switch each tilt cylinder 160, 162 between the pressure control mode and the flow control mode. In another nonlimiting implementation, the controller 150 may be configured to control each tilt cylinder 160, 162 independently of another tilt cylinder 160, 162.

The sensors 140 may be configured to receive one or more inputs. The controller 150 may be configured to calculate a virtual force from the inputs. The virtual force may be a simulation of a mass, spring, damper system between the underlying surface the boom 106. The controller 150 may utilize an estimate of the mass and center of gravity location that it is controlling. When the mass and center of gravity of the boom 106 are known, the virtual force may replicate the effect of the mass spring damper connected to a ground measurement. Tuning the controller 150 may involve selecting a damping ratio and natural frequency that provide the desired performance. This may be derived by looking at the required most significant variations in topology of the underlying surface and speed to cover the topology along with the range that must be maintained. In other words, the boom suspension system 100 may select the desired frequency response of the system. The high frequency response of the mechanical components of the boom 106 may ensure ideal pressure tracking behavior. This is aided with the closed loop system of the pressure control mode, including when the pressure sensors 180 may be utilized to alleviate hysteresis and continuously calibrate the actuation system. Because pressure control may be a closed loop system, the boom suspension system 100 may use feedforward estimates of losses to compensate for the dynamics of the control valve 176 of the hydraulic circuit 170.

With reference to FIGS. 6, 9A and 9B, the virtual spring and damper are illustrated as being mounted at each sensor 140 location. Additional virtual locations, such as the one in the center, could be estimated using the existing sensors 140 on either side. With reference to FIG. 9A, an equivalent second force can be calculated at the cylinder to replicate the virtual force each sensor 140 location, for example the five spring, damper locations shown, which may be based upon the displacement and velocity relative to the underlying surface. As shown in FIGS. 6 and 9B, the force of a given tilt cylinder, $F_{LIFT\ CYL}$, may be as follows:

$$F_{LIFT\ CYL} = \frac{X_{VS}}{X_{CYL}\text{SIN}(\theta_{BMCYL})}(F_{L2} + F_{L1} + F_C + F_{R1} + F_{R2})$$

$X_{VS}$ is the distance of the virtual spring measured from a rod of the piston 162 to the location of the downward force of the virtual spring. $X_{CYL}$ is the distance of the cylinder from the rod of the piston 162 to the attachment point on the frame. The angle of the boom cylinder, $\theta_{BMCYL}$, may be measured from angle of the piston 162 relative to an axis parallel to an underlying surface. $F_{L2}$ is the force calculated at the second left cylinder, $F_{L1}$ is the force calculated at the first left cylinder, $F_C$ is the force calculated at the center of the boom, $F_{R1}$ is the force calculated at the first right cylinder, and $F_{R2}$ is the force calculated at the second right cylinder. The downward virtual force $F_{VS}$ may be the summation of virtual forces $F_{L2}+F_{L1}+F_C+F_{R1}+F_{R2}$.

Turning to FIG. 9B, each of the springs effectively should have the correct preload and spring rate/damping constants to achieve a desired frequency response. The preload can be achieved through an adaptive calibration. Three virtual rigid bodies 152 may comprise a mass, a center of gravity, and a schematically represented equivalent system 154 of the virtual rigid bodies 152. In another implementation, one sensor 140 per boom structure (such as a right wing or left wing boom structure) to be the utilized sensor if it is the closest to the underlying surface. The embodiment leveraging linear elements is exemplary, but directly extensible to non-linear elements as well. Below are calculations representing the virtual forces for the tilt cylinders 160 disposed left and right relative to the center.

i=index of location: {L2, L1, C, R1, R2}, where L2 is the second left location, L1 is the first left location, C is the center location, R1 is the first right location, and R2 is the second right location.

$$F_i = k_i h_i + b_i \dot{h}_i,$$

where k is a first constant and b is a second constant, and $\dot{h}$ is a derivative of height.

$$F_{CYL-L} = \frac{1}{d_{CYL-L}}\left(F_{L1}d_{L1} + F_{L2}d_{L2} - d_{w-152}w_{152}\text{COS}(\theta_L + \theta_C)\right)$$

-continued
$$F_{CYL-R} = \frac{1}{d_{CYL-R}}\left(F_{R1}d_1 + F_{R2}d_{R2} - d_{w-152}w_{152}\text{COS}(\theta_R + \theta_L)\right)$$

The controller 150 may be configured to calculate a second force substantially equivalent to the virtual force, and be tasked with controlling the valve to achieve the force in the hydraulic cylinder 182 when in a force or pressure control mode. Controller inputs may include one or more of the following: cylinder position, cylinder velocity, and cylinder pressure. The controller 150 may also be configured to simultaneously calculate a current cylinder force and an adjustment of the cylinder force command. For example, the current cylinder force may be calculated from one or more of the cylinder position, the cylinder velocity and the cylinder pressure. The adjustment of the cylinder force command may be calculated from the cylinder position and the cylinder velocity to apply a virtual snubber to the hydraulic cylinder 182 to reduce impact loading. In another nonlimiting example, the controller may be configured to calculate target pressures of the head end and the rod end of the hydraulic cylinder.

By regulating the pressure, when the chassis 104 undergoes a sudden movement from an input, such as bump on the ground, rather than exerting a high force on the boom 106 due to the trapped oil in the hydraulic cylinder 182, which may cause the boom 106 to move, the oil will exhaust to maintain the same force on the boom 106. In another example, when the chassis 104 undergoes a sudden movement from an input, such as hole on the ground, rather than losing the appropriate force on the boom 106 due to an unexpected loss of fluid in the hydraulic cylinder 182, which may cause the boom 106 to move, the oil will fill to maintain the same force on the boom 106. In yet another implementation, the input may not be an undulation of the underlying surface. Rather, the input may be a loss of electrical current. In such nonlimiting example of losing electrical current, each pressure regulating valve 178 of the hydraulic circuit may default to a normally high pressure and fill the piston side 192 of the hydraulic cylinder 182 to prevent the boom structures from contacting the underlying surface.

The flow control mode may be utilized for certain functions such as deploying the lift arms 112, activating the sprayer to deliver a desired liquid to the ground, or other non-field operation functions. The flow control mode may be open loop system. The pressure control mode may be utilized during field operation to continuously evaluate inputs to determine if the hydraulic cylinder 182 should be exhausted or filled with oil to maintain a substantially consistent height of the boom 106 relative to the underlying surface. The pressure control mode may be a closed loop system.

Figure 7B:
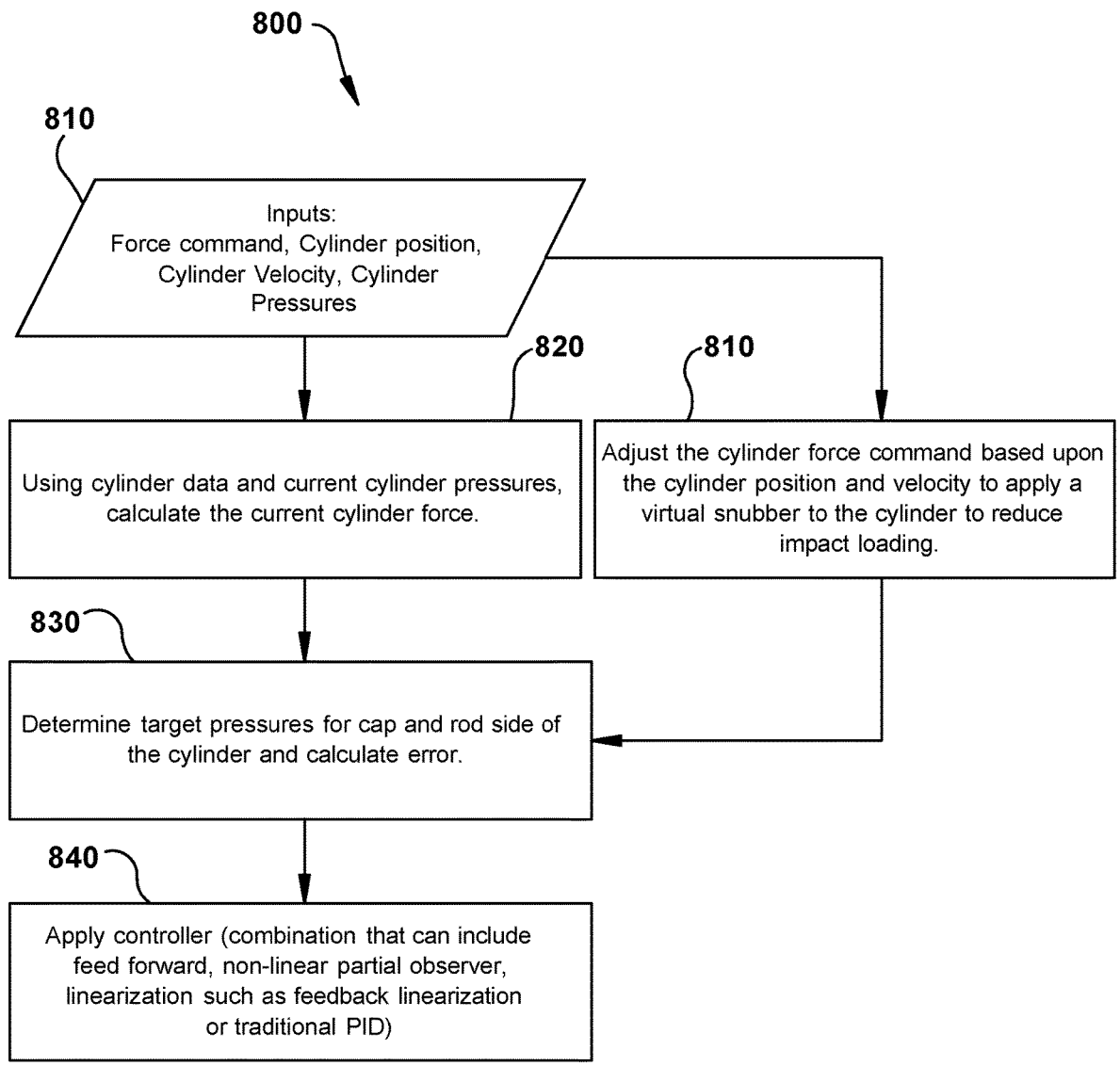
FIG. 7B is a flow chart illustrating one implementation of the pressure control of FIG. 7A.
Figure 7C:
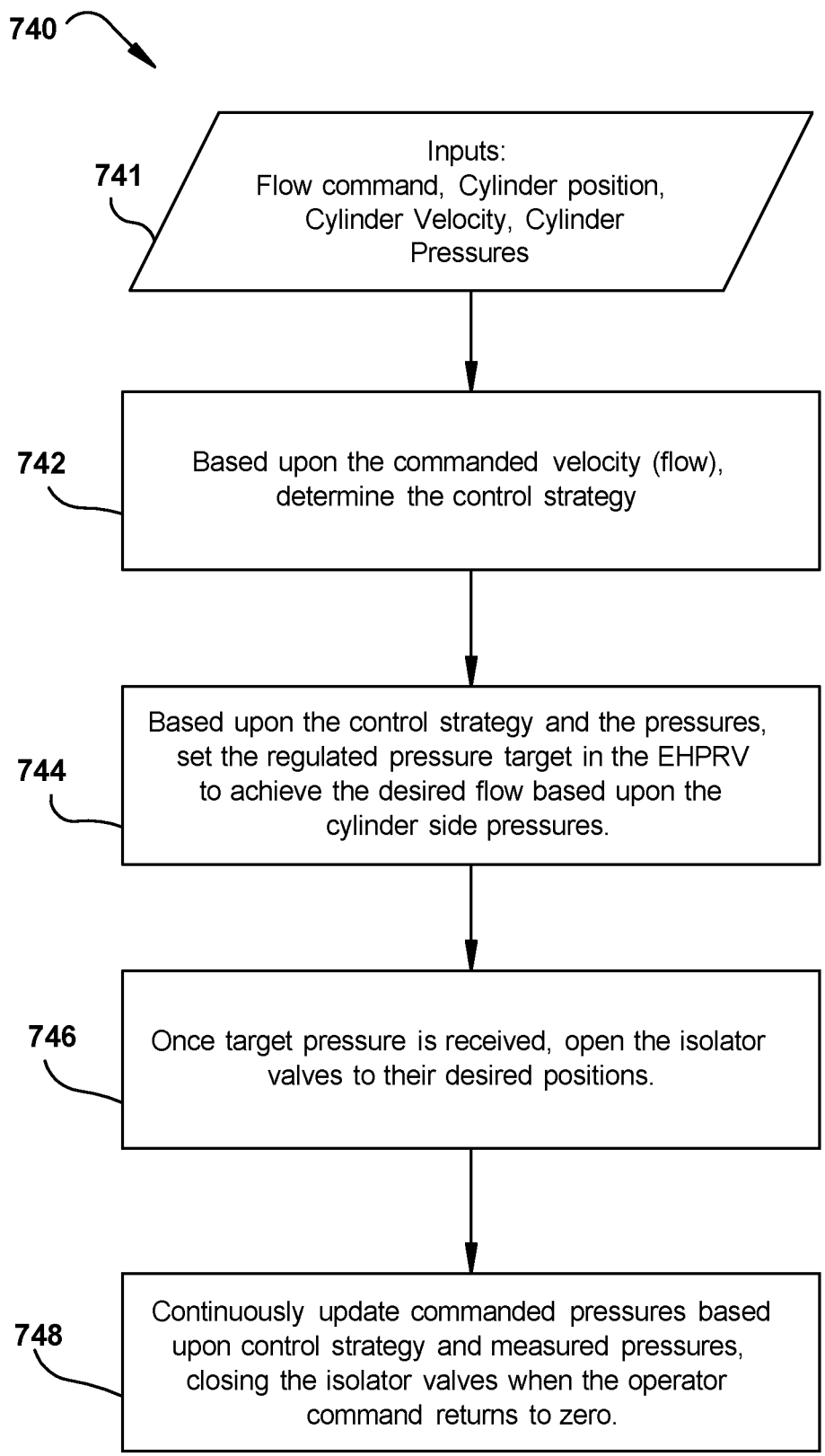
FIG. 7C is a flow chart illustrating one implementation of flow control of FIG. 7A.

Turning to FIGS. 7A-7C, flow charts illustrate one example method for the boom suspension system 100. The controller 150 may acquire sensor data 700, such as, but not limited to, ultrasonic sensor data, cylinder position, cylinder pressure, or data from an inertial momentum unit ("IMU"). Additionally, the controller 150 may acquire operator data and vehicle speed 710. Acquired operator data may include without limitation, activation of the sprayer, spray active height control being on or off, and the hydraulic system commands. The controller 150 may then determine if the hydraulic system, meaning the hydraulic circuit 170 for example, should be in the flow control mode or the pressure control mode. The controller determines if the pressure control is active 730. If it is not active, the controller receives and processes date in the flow control mode, which is shown in FIG. 7C by way of example. If the controller determines the hydraulic system should be in pressure control mode, commanded height adjustments being as the controller acquires sensor data 700. With the pressure control active, the controller 150 may then calculate the height and velocity at each sensor 140 location 750. In one implementation, the IMU may be operably and communicatively couple with the controller 150. The IMU may be utilized to determine high frequency estimation of movement of the boom 106. A camera may be utilized to look forward and provide the rate at which the terrain is changing height. In yet another example, the sensors 40 may be utilized to measure the height at its specific location measured from the underlying surface and the sensor 40 location on the boom 106. The height and velocity data at each sensor location are utilized to calculate the virtual force at such sensor location 760. Next, the controller 150 calculates the equivalent force on the boom 106, which is a rigid body, in order to apply the virtual forces via the hydraulic cylinders 780. This may occur through three or four degrees of freedom depending upon the whether the center frame 110 is a fixed central frame 122 or the floating central frame.

An example of the pressure control 800 is shown in FIG. 7B. Once again, various inputs may be acquired, including without limitation, force command, cylinder position, cylinder velocity and cylinder pressures. The cylinder force command may be adjusted based upon the cylinder position and vehicle velocity to apply a virtual snubber to the hydraulic cylinder to reduce the impact loading 810. Simultaneously, hydraulic cylinder data and current hydraulic cylinder pressures may be used to calculate the current cylinder force 820. Next target pressures are determined for the piston side and rod side of the hydraulic cylinder and error may be calculated 830. The controller 150 can then apply the calculated values to determine pressure at the hydraulic cylinders, which results in hydraulic fluid being filled into or removed from the cylinder to maintain the height of the boom 106 relative to the underlying surface 840. Applying these calculate values may be accomplished through a variety of means, including without limitation, one or more of feed forward, non-linear partial observer, linearization such as feedback linearization or traditional proportional integral derivative controller. The closed loop pressure control scheme continuously acquires the inputs to adjust the tilt cylinders 160, 162 to maintain the height of the boom 106 relative to the underling surface.

With reference to FIG. 7C, the flow controller 740 is shown. Again, inputs are acquired, including without limitation, force command, cylinder position, cylinder velocity and cylinder pressures. Based upon the commanded velocity, the control strategy is determined 742. Once the control strategy is determined and the pressures, the controller 150 may set the regulated pressure target in the EHPRV to achieve the desired flow based upon the cylinder side pressures 744. Once the target pressure is received, isolator valves are open to their desired positions 746. Commanded pressures may be continuously updated based upon the control strategy and the measured pressures, which then may lead to closing isolator valves when the operator command returns to zero 748. The flow controller 740 scheme may be an open loop system.

Based upon the forgoing description for the boom control system 100, a method using the boom control system 100, which may be utilized for controlling boom structures, is now described. The method for controlling boom structures may comprise the steps of identifying input data from sensors. Each sensor may be operably connected to boom structures. The sensors may be configured to sense a distance between each boom structure and an underlying surface. The pair of boom structures may extend laterally outward from opposing sides of a center frame for pivotal movement upward and downward relative to the center frame. The center frame may be operably connected to a main frame with linkages configured for vertical movement. The center frame may comprise a top member and a bottom member. Next, forces may be determined for the tilt cylinders. At least one tilt cylinder may be coupled between each boom structure and the center frame. Each tilt cylinder may be operably connected to a hydraulic circuit. The hydraulic circuit may comprise a flow control mode and a pressure control mode determined by the controller. The hydraulic circuit may comprise a first set of valves and a second set of valves. The first set of valves may be in parallel with the second set of valves. Each set of valves may comprise a solenoid valve in series with a pressure regulating valve and a pressure sensor disposed on either side of each solenoid valve. As a result, the boom structures may be maintained above the underlying surface during the pressure control mode.

The method may further comprise the steps of calculating a virtual force from the height and velocity. The second force may be substantially equivalent to the virtual force. The second force may be calculated and configured to prevent the virtual force from being transmitted to the hydraulic cylinder, and ultimately to the boom structures.

The method may next determine the current cylinder force from one or more of a cylinder position, a cylinder velocity and a cylinder pressure. Adjustment of the cylinder force command from the cylinder position and the cylinder velocity may be done in order to apply a virtual snubber to a hydraulic cylinder, which may be operably connected to the hydraulic circuit. This results in reducing impact loading to the boom structures. Target pressures may be calculated to achieve the desired virtual force. Further, the height of the boom structures may be substantially maintained above the underlying surface.

The word "exemplary" is used herein to mean serving as an example, instance or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Further, at least one of A and B and/or the like generally means A or B or both A and B. In addition, the articles "a" and "an" as used in this application and the appended claims may generally be construed to mean "one or more" unless specified otherwise or clear from context to be directed to a singular form.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. Of course, those skilled in the art will recognize many modifications may be made to this configuration without departing from the scope or spirit of the claimed subject matter.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure.

In addition, while a particular feature of the disclosure may have been disclosed with respect to only one of several implementations, such feature may be combined with one or more other features of the other implementations as may be desired and advantageous for any given or particular application. Furthermore, to the extent that the terms "includes," "having," "has," "with," or variants thereof are used in either the detailed description or the claims, such terms are intended to be inclusive in a manner similar to the term "comprising."

The implementations have been described, hereinabove. It will be apparent to those skilled in the art that the above methods and apparatuses may incorporate changes and modifications without departing from the general scope of this invention. It is intended to include all such modifications and alterations in so far as they come within the scope of the appended claims or the equivalents thereof.

What is claimed is:

1. A boom suspension system, comprising:
    a center frame operably connected to a main frame with linkages configured for vertical movement, the center frame comprising a top member and a bottom member;
    a pair of boom structures extending laterally outward from opposing sides of the center frame for pivotal movement upward and downward relative to the center frame;
    a sensor operably connected to each boom structure configured to sense the distance between each boom structure and the underlying surface;
    a controller configured to receive input data from each sensor and determine forces or flow rate to tilt cylinders, at least one tilt cylinder being coupled between each boom structure and the center frame;
    each tilt cylinder operably connected to a hydraulic circuit, the hydraulic circuit comprising a flow control mode and a pressure control mode determined by the controller, the hydraulic circuit comprising:
        a first set of valves and a second set of valves, the first set of valves in parallel with the second set of valves, each set of valves comprising:
            a controlled lockout valve in series with a pressure regulating valve; and
            a pressure sensor disposed on either side of each pressure regulating valve.

2. The boom suspension system of claim 1, further comprising a frame tilt cylinder operably connected between the center frame and a vehicle chassis, the frame tilt cylinder comprising a frame tilt hydraulic circuit.

3. The boom suspension system of claim 1, wherein the center frame is a fixed center frame.

4. The boom suspension system of claim 1, wherein the center frame is a floating frame operably connected to a fixed center frame.

5. The boom suspensions system of claim 1, wherein the controller automatically switches each tilt cylinder between the pressure control mode and the flow control mode.

6. The boom suspension system of claim 5, wherein the controller is configured to control each tilt cylinder independently of another tilt cylinder.

7. The boom suspension system of claim 6, wherein the controller is configured to receive a plurality of inputs, the controller providing a plurality of outputs to each tilt cylinder so as to maintain a pressure pattern that maintains a substantially constant height between the boom structure and the underlying surface.

8. The boom suspension system of claim 1, wherein each hydraulic circuit is operably connected to a hydraulic cylinder, the hydraulic cylinder further comprises:
    a head end coupled with the first set of valves;
    a rod end coupled with the second set of valves;
    a fluid pressure source; and
    a fluid reservoir.

9. The boom suspension system of claim 8, wherein each pressure regulating valve of the hydraulic circuit has a high pressure, wherein loss of electrical current defaults to the normally high pressure to prevent the boom structures from contacting the underlying surface.

10. The boom suspension system of claim 8, wherein the sensor is configured to receive one or more inputs, wherein the controller is configured to calculate a virtual force from the inputs.

11. The boom suspension system of claim 10, wherein the controller is configured to calculate a second force substantially equivalent to the virtual force, the second force configured to prevent the virtual force from being transmitted to the hydraulic cylinder.

12. The boom suspension system of claim 8, wherein the controller is configured to receive one or more inputs, the inputs comprising one or more of: cylinder position, cylinder velocity, and cylinder pressure.

13. The boom suspension system of claim 12, the controller configured to simultaneously calculate:
    a current cylinder force from one or more of the cylinder position, the cylinder velocity and the cylinder pressure; and
    an adjustment of the cylinder force command from the cylinder position and the cylinder velocity to apply a virtual snubber to the hydraulic cylinder to reduce impact loading.

14. The boom suspension system of claim 13, the controller configured to calculate target pressures of the head end and the rod end of the hydraulic cylinder.

15. The boom suspension system of claim 1, wherein the flow control mode is an open loop system and the pressure control mode is a closed loop system.

16. A method for controlling boom structures, comprising the steps of
    identifying input data from sensors, each sensor operably connected to boom structures, the sensors configured to sense a distance between each boom structure and an underlying surface; the pair of boom structures extending laterally outward from opposing sides of a center frame for pivotal movement upward and downward relative to the center frame; the center frame operably connected to a main frame with linkages configured for vertical movement, the center frame comprising a top member and a bottom member;

determining forces to tilt cylinders, at least one tilt cylinder being coupled between each boom structure and the center frame; each tilt cylinder operably connected to a hydraulic circuit, the hydraulic circuit comprising a flow control mode and a pressure control mode determined by the controller, the hydraulic circuit comprising:
- a first set of valves and a second set of valves, the first set of valves in parallel with the second set of valves, each set of valves comprising:
- a solenoid valve in series with a pressure regulating valve; and
- a pressure sensor disposed on either side of each solenoid valve; and, maintaining boom structures above the underlying surface during the pressure control mode.

17. The method of claim 16, further comprising a frame tilt cylinder operably connected between the center frame and a vehicle chassis, the frame tilt cylinder comprising a frame tilt hydraulic circuit.

18. The method of claim 16, further comprising the steps of:
calculating a virtual force from the height and velocity, a second force substantially equivalent to the virtual force; and,
calculating a second force configured to prevent the virtual force from being transmitted to the hydraulic cylinder.

19. The method of claim 18, further comprising the steps of:
determining a current cylinder force from one or more of a cylinder position, a cylinder velocity and a cylinder pressure; and
adjusting a cylinder force command from the cylinder position and the cylinder velocity to apply a virtual snubber to a hydraulic cylinder operably connected to the hydraulic circuit; and,
reducing impact loading to the boom structures.

20. The method of claim 19, further comprising the step of:
calculating target pressures to achieve desired equivalent virtual force.

* * * * *